United States Patent Office 2,826,585
Patented Mar. 11, 1958

2,826,585
2-PYRIDYLETHYLMERCAPTOPYRIDINE-N-OXIDES

Francis E. Cislak, Indianapolis, Ind., assignor to Reilly Tar & Chemical Corporation, Indianapolis, Ind., a corporation of Indiana No Drawing. Application April 18, 1957
Serial No. 653,537

4 Claims. (Cl. 260—294.8)

This invention relates to 2-pyridylethylmercaptopyridine-N-oxides and to the process of making them. More particularly, it relates to 2-pyridylethylmercaptopyridine-N-oxides having the following general formula:

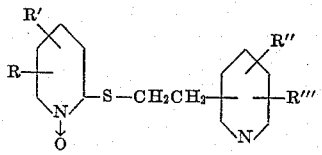

where R and R' are hydrogen, lower alkyl, hydroxylower alkyl, or halogen; and R" and R''' are hydrogen or lower alkyl.

In general the compounds of my invention may be prepared by reacting a vinylpyridine with a 2-mercaptopyridine-N-oxide. The equation below portrays the preparation of 2-4'-pyridylethylmercaptopyridine - N - oxide:

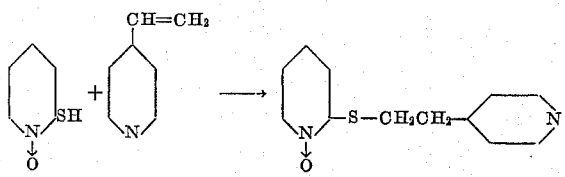

They may also be made by reacting a 2-halogenopyridine-N-oxide with an alkali metal salt of a mercaptoethylpyridine. The equation below portrays the preparation of 2-2'-pyridylethylmercaptopyridine-N-oxide:

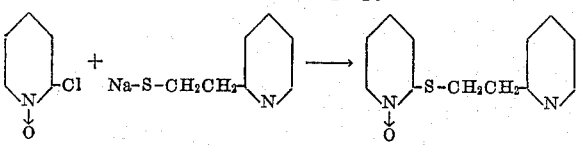

My invention will be described more fully in conjunction with the following specific examples. These examples are given by way of illustration only and are not to be construed as a limitation of my invention.

EXAMPLE 1

2-3'-pyridylethylmercaptopyridine-N-oxide

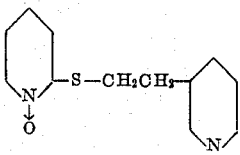

An aqueous solution of 40 grams of the sodium salt of 3-mercaptoethylpyridine is warmed to a temperature of about 50° C. While stirring this solution, there is added to it, in small portions, 50 grams of 2-bromopyridine-N-oxide. After all of the latter has been added, the reaction mixture is heated for about another hour at a temperature of from about 50° C. to 70° C. Then there is added about 5 to 10 grams of decolorizing carbon, and the mixture is hot filtered. The filtrate is cooled to about 15–25° C. and made acid (pH 1.7) with hydrochloric acid. The 2-3'-pyridylethylmercaptopyridine-N-oxide is recovered in any convenient manner, recrystallized from alcohol, and dried.

EXAMPLE 2

2-2'-5'-ethylpyridylethylmercapto-5-methylpyridine-N-oxide

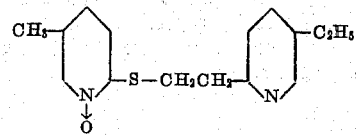

The procedure of Example 1 is repeated with the exception that 2-mercaptoethyl-5-ethylpyridine is used in place of 3-mercaptoethylpyridine and 2-bromo-5-methylpyridine-N-oxide is used in place of the 2-bromopyridine-N-oxide.

EXAMPLE 3

2-4'-pyridylethylmercaptopyridine-N-oxide

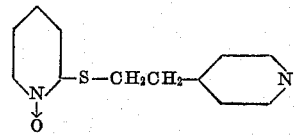

The procedure of Example 1 is repeated with the exception that 4-mercaptoethylpyridine is used in place of the 3-mercaptoethylpyridine.

EXAMPLE 4

2 - 2' - 4',6' - dimethylpyridylethylmercaptopyridine - N-oxide

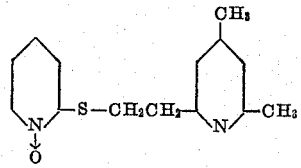

The procedure of Example 1 is repeated with the exception that 2-mercaptoethyl-4,6-dimethylpyridine is used in place of the 3-mercaptoethylpyridine.

EXAMPLE 5

2 - 2'-pyridylethylmercapto-5-bromopyridine-N-oxide

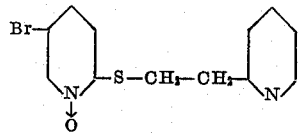

To a solution of 50 parts of 2-vinylpyridine in 50 parts of pyridine is added 25 parts of 2-mercapto-5-bromopyridine-N-oxide. The mixture is heated at about 100–140° C. for about 5–10 hours. After the reflux period, the reaction mixture is washed with dilute caustic soda to remove any unreacted 2-mercapto-5-bromopyridine-N-oxide. The caustic washed residue is then washed with water and extracted with chloroform, thereby separating the desired 2-2'-pyridylethylmercapto-5-bromopyridine-N-oxide from any polyvinylpyridine that is formed during the reflux period.

EXAMPLE 6

*2-3'-6'-methylpyridylethylmercaptopyridine-N-oxide*

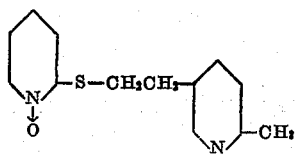

The procedure of Example 1 is repeated with the exception that 3-mercaptoethyl-6-methylpyridine is used in place of 3-mercaptoethylpyridine.

My 2-pyridylethylmercaptopyridine-N-oxides are useful as inhibitors in the pickling of steel with nonoxidizing mineral acids.

The compounds of this invention possess bactericidal and fungicidal properties. A solution of 2-4'-pyridylethylmercaptopyridine-N-oxide in 4-nonylpyridine has pronounced fungicidal properties. Quaternary ammonium salts of my compounds are useful as disinfecting and sterilizing agents.

I claim as my invention.

1. 2-pyridylethylmercaptopyridine-N-oxides having the following general formula:

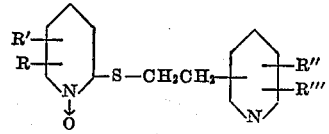

wherein R and R' are selected from the group consisting of hydrogen, lower alkyl, hydroxy-lower alkyl, and halogen; R" and R'" are selected from the group consisting of hydrogen and lower alkyl.

2. 2-4'-pyridylethylmercaptopyridine-N-oxide.
3. 2-2'-pyridylethylmercaptopyridine-N-oxide.
4. 2 - 3' - 6' - methylpyridylethylmercaptopyridine - N-oxide.

No references cited.